United States Patent [19]

Savard, Jr.

[11] Patent Number: 4,527,652
[45] Date of Patent: Jul. 9, 1985

[54] GOLF CART AND SIMILAR VEHICLES

[75] Inventor: Hassel J. Savard, Jr., Neshanic, N.J.
[73] Assignee: Golf-Eze, Inc., Linden, N.J.
[21] Appl. No.: 460,945
[22] Filed: Jan. 25, 1983

Related U.S. Application Data

[62] Division of Ser. No. 233,042, Feb. 10, 1981, abandoned.

[51] Int. Cl.³ .............................................. B61D 51/04
[52] U.S. Cl. ..................................... 180/19.3; 192/46; 280/DIG. 5
[58] Field of Search ................. 180/19 H, 19 S, 19 R, 180/11; 280/DIG. 5; 192/46

[56] References Cited

U.S. PATENT DOCUMENTS

| | | | |
|---|---|---|---|
| 1,539,186 | 5/1925 | Heller | 180/19 H |
| 2,879,858 | 3/1959 | Thomas | 180/19 H |
| 3,815,699 | 6/1974 | Ganskopp et al. | 180/19 R |
| 3,893,530 | 7/1975 | Gordon | 180/19 H |

FOREIGN PATENT DOCUMENTS

| | | | |
|---|---|---|---|
| 488034 | 10/1975 | U.S.S.R. | 192/46 |
| 618588 | 6/1978 | U.S.S.R. | 192/46 |
| 625070 | 9/1978 | U.S.S.R. | 192/46 |

Primary Examiner—John A. Pekar
Attorney, Agent, or Firm—Bucknam and Archer

[57] ABSTRACT

A motor driven vehicle is described which has a control handle grasped by the operator, the handle having an inner portion connected to the vehicle and a free end portion. The speed is controlled in accordance with the position of the free end of the handle by a novel device which includes a rheostat connected to the drive motor and a rack and pinion mechanism connected to the rheostat. The drive motor is a direct current electrical motor and the rheostat has a resistance portion corresponding to and effecting a braking action on the vehicle through the motor. The novel clutch comprises an inner hub and an outer hub, and one of the inner and outer hubs has a serrated surface and the outer hub carries a plurality of needles extending toward the serrated surface the needles being canted in a given direction so that rotary motion can be transmitted in a predetermined direction between the hubs whereas for the opposite direction the hubs are substantially free-wheeling.

1 Claim, 12 Drawing Figures

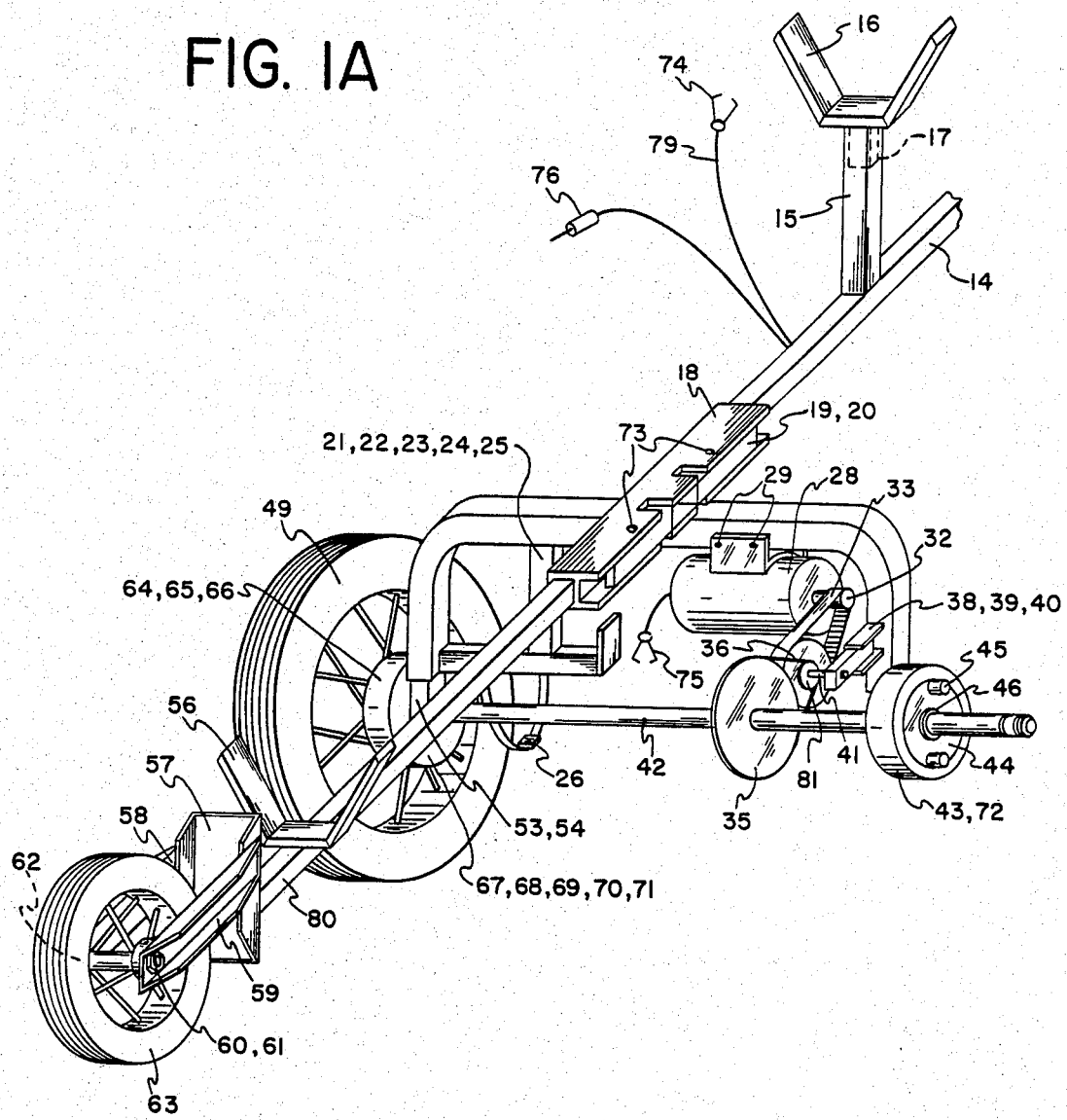
FIG. IA

FIG. 2B
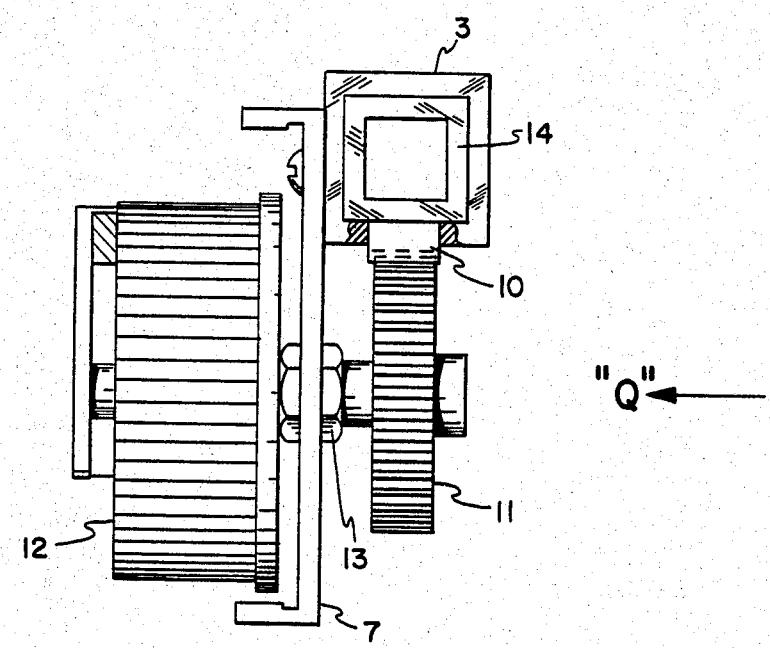
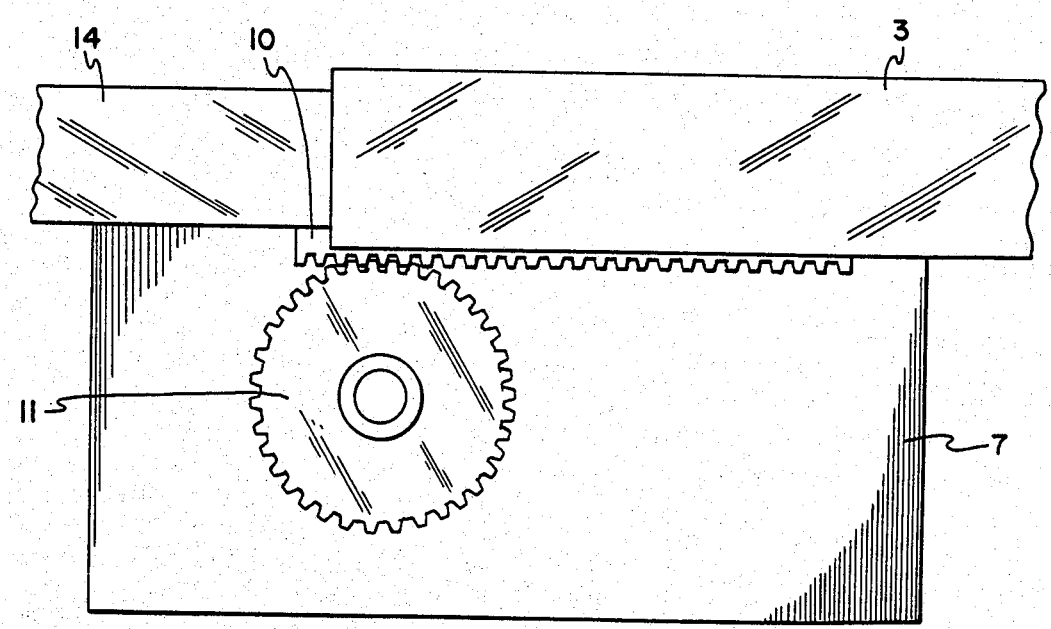
VIEW "Q"
FIG. 2A

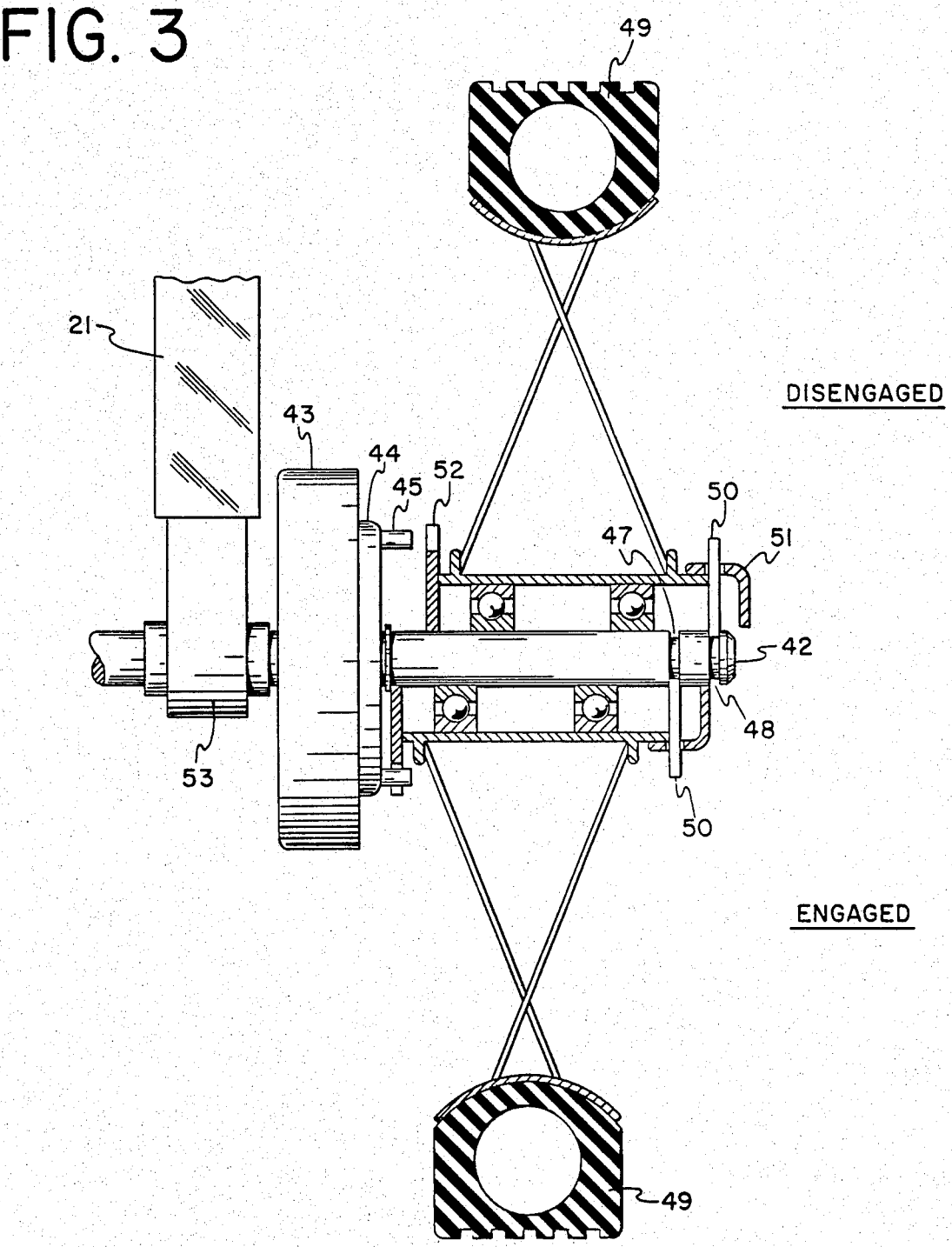

GOLF CART AND SIMILAR VEHICLES

This is a division of application Ser. No. 233,042, filed Feb. 10, 1981, now abandoned.

This invention relates to carts for transporting bags, loads or equipment of different types and more specifically to golf carts.

Many golf carts have been proposed both of the two-wheel type and the three-wheel type. Power drive has been applied, together with controls which may include on-off switches or forward-reverse switches and speed controls. Usually, the power unit in in the form of an electric motor and power is supplied by means of a storage battery unit with the battery being placed outside of one of the wheels. A three-wheeled vehicle provided with a handle which includes spring-biased means capable of varying the current supplied to the motor depending upon the tension applied to the handle, has been described in U.S. Pat. No. 2,879,858. In this patent, the operator grasps the handle and pulls on it in the direction of movement, the vehicle follows the handle and when the operator stops, the vehicle stops. The cart of this patent is also intended to be readily operative by manual operation in the event that the battery is discharged.

The use of a clutch which may be disengaged in order to permit free-wheeling and manual operation is described in U.S. Pat. No. 3,719,247. This patent utilizes a switch for energizing and deenergizing the motor. The clutch of this patent consists of a disc axially slidable on the square end of a drive shaft with axially outwardly extending clutch teeth. The clutch is provided with a coiled spring and a yoke which is used to shift the disc towards and away from another clutch member which is provided with recesses for receiving the clutch teeth.

U.S. Pat. No. 3,731,756 describes a device for controlling the speed of the cart by means of a cord, the speed of the cart depending upon the extension of the cord which cord is extended into the interior of the power unit housing and is fastened around a pulley. When the cord is pulled, it rotates the pulley and the shaft. A cord is also used in U.S. Pat. No. 3,989,116 together with a spring and a sliding member.

The cart of U.S. Pat. No. 3,815,699 moves in front of the operator. This cart is operated with an on-off switch, a speed control switch and a timer switch.

One drawback of all the known golf carts is that they are expensive to manufacture and require a conventional type clutch. Another drawback is that most of the known carts require at least an on-off switch.

One object of the present invention is to provide a golf cart which is in front of the player in actual operation and which permits to adjust the speed easily merely by pushing the handle into a member in which the handle is telescopically inserted and which does not require an on-off switch.

Another object is to provide a golf cart which by a simple device may be adapted to be behind the player in actual operation.

Another object is to provide a golf cart which is battery energized and which provides braking by a simple mechanism.

Still another object of the present invention is to provide a novel golf cart with a novel clutch which is manufactured less expensively than conventional clutches.

Still another object of the present invention is to provide a golf cart which may be manufactured without precision instruments, which may be easily assembled and disassembled and which is operated manually if the battery is discharged or if necessary to operate it manually for any reason.

One embodiment of the invention is illustrated in the accompanying drawings in which:

FIG. 1A is a view partially in perspective of a portion of the golf cart with one side wheel.

FIG. 2A is a top view of the sliding handle and stem assembly showing the rheostat, the rack and the pinion arrangement.

FIG. 2B is a side view of the sliding handle of FIG. 2A, along the direction Q.

FIG. 3 illustrates in detail the connection of the side wheels to the axle.

Figures 1B, 1C:
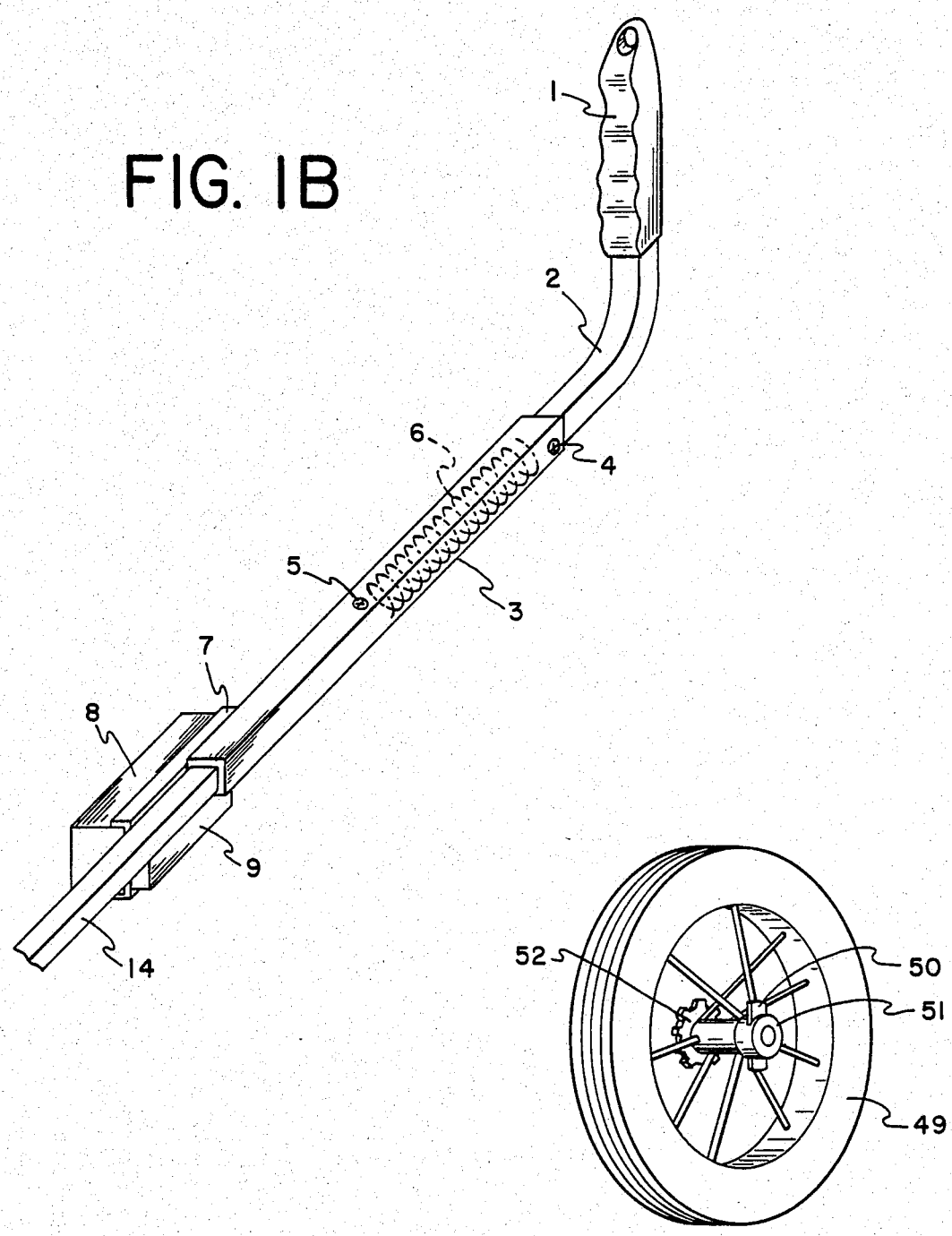
FIG. 1B illustrates the upper stem and the handle.
FIG. 1C illustrates the other side wheel.

In accordance with the present invention, the golf cart comprises a tubular frame, which includes at least one bag support bracket, a drive frame arranged at right angle to the tubular frame, a front guide wheel at one end of the tubular frame. The drive frame is removably connected to the tubular frame and comprises a single inverted U-shaped frame with an axle supported for rotation in the ends of the U-shaped frame and two side wheels removably connected to the opposite ends of the axle. The electric motor is supported by the U-shape frame and the battery is preferably mounted on the tubular frame.

By reference to FIG. 1, the golf cart comprises the tubular frame which consists of an upper stem 14 and a lower stem 80. Bag support brackets 16 and 56 are carried by the tubular frame. Yoke 21 in the shape of an inverted U, supports motor 28. The front wheel 62 is mounted onto the stem 80 of the tubular frame. The two side wheels 49 are mounted on the axle 42 of the yoke.

As shown in FIGS. 1B, 2A, and 2B, the handle means comprises a handle 2 and a grip member 1 connected at the distal end. The sliding member 3 is connected at the distal end to the handle 2. Numeral 4 is a handle screw and numeral 6 designates a spring. Numerals 7 and 8 designate a rheostat bracket and cover respectively. Numeral 9 is the pinion cover, numeral 10 is the rack and numeral 11 is the pinion. Numeral 13 designates a mounting nut.

The handle 2 is mounted with respect to the sliding handle 3 against the spring 6. A pair of through holes at 90° angle to each other is provided at this adjustment end of the handle 2 so that the handle 2 is attached to the sliding handle 3 in anyone of four positions at 90° increments relative to the axis of the cart. After the handle 2 has been inserted into the sliding handle 3 and after it has been adjusted to the desired angular position, the screw 4 is inserted through the sliding handle 3 and handle 2.

Numeral 5 is a top screw which protrudes through the sliding handle 3 and engages a slot cut into the upper stem 14. The motion of the sliding handle 3 is limited to the length of the slot in the upper stem 14 less the diameter of the screw 5. Sliding handle 3 is provided with a cut-out portion as shown in FIG. 2 so that an open space is provided to permit the rack 10 which is attached to the lower portion of the upper stem 14, to enter the lower end of the sliding handle 3 when the handle 2 is positioned towards the upper bag support portion 16. The spring 6 is prevented from moving towards support 16 by the end of the upper stem 14 and at the opposite end it is restrained by the end of the handle 2. In this manner, the spring 6 provides a restoring force to the sliding handle 3 when it is pushed towards bag support 16.

Rheostat bracket 7 is attached to the sliding handle 3 and rheostat 12 is mounted to the bracket 7 as shown in FIG. 2 by means of a nut 13. Pinion 11 is attached to the rheostat 12 so that the rack 10, which is attached to the upper stem 14, becomes engaged.

When the sliding handle 3 is pushed towards the bag support 16, the position of the rheostat 12 changes relative to the rack 10 and a rotation of pinion 11 results. This is turn causes the central portion of the rheostat 12 to rotate. In this manner, a resistance which is in proportion to the distance to which the sliding handle 3 has been depressed, is achieved. To state the matter in different words, the greater the distance the handle has been depressed towards the support 16, the lower is the resistance which is obtained.

The upper bag support 16 is equipped with a rectangular member 17, which engages the upper bag support receiver 15. This bag support 16 can be rotated in increments of 90° to provide adjustment for smaller packages.

The lower bag support 56 is attached to the lower stem 80 and positioned relative to the lower bag stop 57 in a manner as to accept the lower boot of the bag which is to be carried on the cart. The wheel struts 58 and 59 are attached to the lower bag stop, and at the far end contain holes which accept the front axle 60. The space between struts 58 and 59 is suitable to accomodate the front wheel 63. Nuts 61 and 62 retain the front axle 60.

Figure 7A:
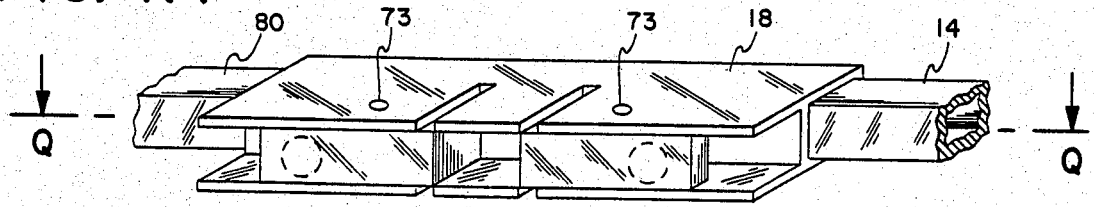
FIGS. 7 and 7B are a side view and a cross section of the clips connecting the upper stem to the lower stem.
Figure 7B:
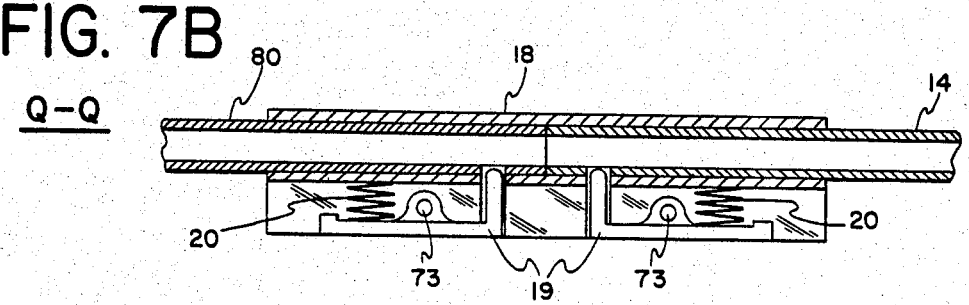

Stem adapter 18 is attached and centrally located on the yoke 21. Stem adapter 18 contains a rectangular central portion which runs axially for the entire length and is of such dimensions to accept the lower end of the upper stem 14 and the upper end of the lower stem 80 as shown in FIG. 7.

Stem adapter 18 contains a pair of longitudinal ribs which serve as retainers for a pair of stem clips 19. Also, a pair of perpendicular slots have been cut through the ribs and into and through the inner wall of the stem adapter 18. These slots allow the front portion of the stem clip 19 to protrude into the rectangular center portion of the stem adapter 18. The stem clip 19 is mounted to the stem adapter by means of clips 73. A slot is cut into the appropriate face of both upper and lower stems 14 and 80, so that when 14 and 80 are inserted into the stem adapter 18, the stem slots align with the adapter slots into 18 and are therefore engaged by the front portion of the stem clips 19. This engagement is maintained by spring 20. When the upper stem 14 or the lower stem 80 is to be removed, the stem clip 19 which pivots the front portion of the clip is taken out of the slot and allows the engaged part of 14 or 80 to be disengaged.

The yoke 21 has motor 28 attached by two bolts 29. A pulley 32 is mounted to motor 28. A tightener track 38 is attached to the yoke 21 and has an internal track which supports the side of the tightener slide 39, thus removing stress from the tightener slide due to cart operation. The tightener slide 39 contains an intermediate post 41 to which is mounted a reducer pulley 81. The reducer pulley is a two-section device; the larger portion is for gear belt material 33 which connects to the motor; and the smaller portion is for chain 36, which connects to the axle sprocket 35.

During assembly, a motor belt 33 and axle chain 36 with link 37 are installed. The tightener slide 39 is moved toward the front wheel 63 and both chain 36 and belt 33 are simultaneously tightened. When the correct tightness is achieved, tightener bolt 40 is tightened, and the proper tension is maintained.

The battery basket 22 is attached to the yoke 21 and to the battery basket tube 25 which in turn is connected to the yoke 21 and provides the proper dimensions and position for the battery which operates the cart. Connected with two rivets 27 to the lower portion of the battery basket 22 is lower battery strap 26. Connected to the yoke 21 with one rivet 24, is the upper battery strap 23. This strap 23 contains a string-type clip for securing the lower strap 26. When the battery has been installed, the lower strap 26 is inserted through the clip on the upper strap 23 and the battery is tightened and restrained in the basket 22 by pulling downwardly on the lower strap 26. The battery is released by depressing the clip on the upper strap 23 which releases the tension.

The axle bushing blocks 53 have a groove cut in the same direction as the bushings 54 on each side of the rectangular portion. The axle 42 is mounted to the yoke 21 by inserting the rectangular portions of the axle bushing block 53 into the open central portions of the ends of the yoke 21, and crimping the yoke material into the groove space of the axle bushing blocks 53. The axle bushing 54 provides for the function of rotation of the axle 42 while transmitting the cart weight from the yoke 21 to the axle 42. The axle sprocket 35 is attached and positioned onto the axle 42 so as to line up with the chain position onto the axle 42 so as to line up with the chain position of the reducer pulley 81 to axle chain 36 and to axle sprocket 35 and to axle 42.

As shown in FIG. 3, tires 49 are mounted to the axle 42 and retained by engagement tabs 64 and 50 entering either engagement groove 47 or free wheeling groove 48. Engagement tabs 50 and 64 are located within the caps 51 and 65 and are spring loaded toward the axis of tires 49. In this manner, the engagement tabs 64 and 50 are depressed as the tire 49 is positioned over the axle 42 and are released when positioned over the desired grooves 47 or 48. When the cart in operation and engagement is with grooves 47, the pins 45 on the clutches engage with the sprockets 52 on the wheels as shown in FIG. 3. The manner of connection of the wheels to the yoke is another novel feature of the present invention because it provides for the grooves 48 which permit the cart to be free-wheeling.

One important feature of the present invention is the manner in which the speed of the cart relative to the person operating this cart is maintained automatically regardless of hills, slopes, cart load, etc. This result is achieved because of the manner of the rheostat 12, pinion 11, and rack 10 are oriented relative to cart or cart user. As shown in FIG. 2, when the sliding handle 3 is moved toward the front wheel 63, rack 10 rotates pinion 11 and also rheostat 12. Electrical connections are established and the motor 28 turns tires 49 and the rack 10 is transported in the direction of cart movement.

The slide handle, however, is at this moment fixed in space; therefore, the pinion and rheostat are rotated toward the "Off" position by the cart's own motion. This can be further explained as follows: when a person grasps handle 2 and begins to walk forward, the slide handle 3 begins to move toward the front wheel 63 and the cart runs, but it is running too slow. Therefore, the sliding handle continues to move forward and the cart runs faster until the cart is running at exactly the same speed as the operator is walking. In this sense a fixed distance is being maintained between the cart operator and the cart for any given speed. If the operator slows down, the cart seeks a new speed and then maintains the distance from the operator to the cart. If the operator stops and lets go of handle 2, the sliding handle 3 becomes fully extended and the cart stops. In this manner, a braking mechanism is provided without any on-off switch. The motor in the device according to the present invention is a DC motor. The artisan will understand that in DC motors, a reduction in applied voltage results in a braking effect which can be utilized to deaccelerate the movement of the cart without requiring any other braking device which would require a braking force applied to the wheels or a braking drum or disc attached to a wheel. The inherent braking action is the result of the controlled slip on the clutch as it will be explained hereinafter.

It should be noted, however, that if the yoke is inverted and exchanged, left for right and right for left, if the spring 6 is changed from a compression spring to a tension spring, and if the wiring of the rheostat is changed so that a decrease in resistance is achieved with the extension of the handle, a cart of the pull type is obtained, which is behind the player during operation.

Figure 6:
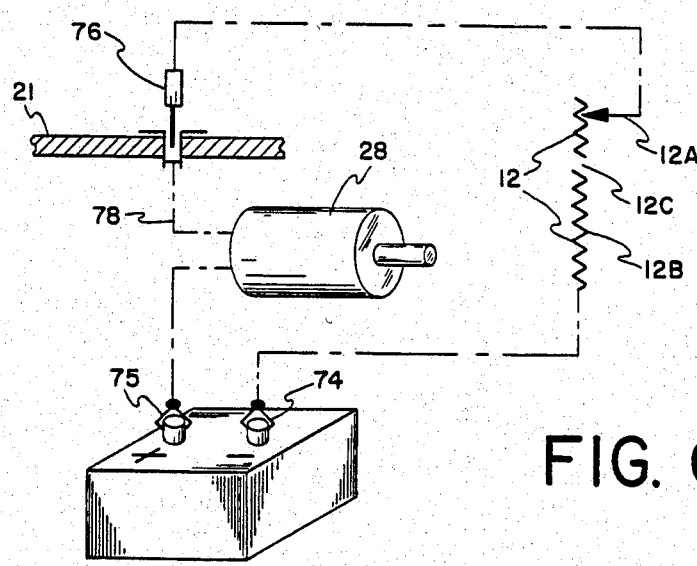
FIG. 6 shows the electric schematic.

The differential action which allows turning is achieved in this manner: The rheostat 12 has been described as providing a varying resistance which is proportional to how far the handle is depressed. This rheostat 12 consists of two sections, a dead section and an active section separated by an insulator section 12C (see FIG. 6). When the cart is idle, the rheostat wiper 12A is located within the dead section. If the handle is depressed, the wiper slides over the insulator section 12C, contacts the active section and the cart becomes energized. In this way, the cart operation is achieved by one simple motion-push to turn on and go. The insulator section serves as an "On" switch. When the cart is activated, electrical current flows out of the battery through the rheostat section 12B out of the wiper 12A, through wire to ground plug 76, through motor ground 78, through motor wire to ground plug 76 through motor ground 78, through motor 28 and back to battery through plus clip 75. This produces a rotation of the motor 28 and, therefore, drive to tires 49.

The novel clutches according to the present invention will now be described in detail by reference to FIGS. 4 and 5. Rotational force is transmitted from the axle bushing 54 to the clutch outer hubs 43 and 67 respectively. Mounted to the interior face of the clutch outer hubs 43 and 67, are a plurality of needles 72 and 70. For this purpose, a material consisting of a multiplicity of steel needles affixed to a base, canted at an angle, of the type of the material ordinarily used to clean files, for instance, the material marketed by the Trim Brush Company, East Hanover, N.J., may be used. In this upper half of the clutch outer hubs 43 and 67, that is the portion which is on top and above the axle 42, these needles 72 and 70 are canted or tipped in a direction pointing towards the front wheel 63. The outside surface of the clutch inner hubs 44 and 68 has a grooved or knurled pattern impressed onto, or machined into it, in a direction which is parallel to the axis of the hole which has been bored in the flat face and through which the axle 42 passes. The needles 72 and 70 engage the groove or knurl in the clutch inner hub, and as the clutch outer hubs 43 and 67 rotate over the top of the axle and toward the front wheel 63, rotational force is transmitted to the clutch inner hubs 44 and 68 and to the protruding tabs 45 and 69, (see FIG. 4). A plate with a plurality of notches or holes and engagement sprocket 52 and 66 (FIGS. 1A and 1C) is mounted to each tire 49 on the central portion, and when the tires 49 are placed over the axle 42, the engagement sprocket 52 and 66 force the surface of the clutch inner hub 44 and 68 into engagement tabs 50 and 64 located in the engagement groove 47. Interference exists because clutch engagement pins 45 and 69 protrude through slots or holes in the engagement sprocket 52 and 66.

Retaining rings 46 and 71 prevent motion of the clutch inner hubs 44 and 68 relative to the clutch outer hubs 43 and 67 in an axial direction along the axle 42. When the engagement tabs 50 and 64 are in the engagement groove 47, rotational drive from the clutch inner hub 44 and 68 is thus transferred through the engagement pins 45 and 69 to the engagement sprocket 52 and 66, and therefore, to the tires 49. If the engagement tabs are in the free wheeling grooves 48, (FIGS. 3 and 4), then this interference does not exist between the engagement pins and the engagement sprocket. In this case, the tires 49 receive no rotational drive from the power train. In this manner, the cart may be operated manually.

It is clear from the foregoing that power from the motor to the wheels is transmitted through reducing pulley 81, to axle sprocket 35, to axle 42, to the clutch outer hub 43, to the needles 72, to the inner hub 44, to engagement pin 45, to sprocket 52 which is mounted on the wheel.

As shown hereinabove, a novel feature of the present invention is the provision of a clutch which may be built less expensively than other conventional clutches from a known material. The clutch may be defined as comprising an inner hub and an outer hub, one of the inner and outer hubs having a serrated surface and the other hub carrying a plurality of needles extending toward the serrated surface for contact with it, the needles being canted in a given direction so that rotary motion can be transmitted in a predetermined direction between the hubs whereas for the opposite direction the hubs are free-wheeling. Another feature of the device is the ability to provide the free wheeling feature in the event of mechanical or electrical failure while in use. The action of the clutch parts described hereinabove when considered as right and left clutches 43, 44, 45 and 72 as right clutches, and 67, 68, 69 and 70 as left clutches, is that of a modified differential. The right and left hand nature of the clutches comes from the direction in which needles 70 and 72 are tipped or canted. The needles are made to adhere to the inner face of the outer hub 43 and 67, and point toward a clockwise or counter-clockwise direction depending upon the type of clutch-left or right hand. The operation of the clutch is as follows: If the clutch inner hub 44 and 68 is held in a fixed position and an attempt is made to rotate the clutch outer hub 43 and 67 in the same direction as the needles 70 and 72 are canted or tipped, each of the needle ends engage some portion of the groove or knurls which have been impressed into the outer surface of the clutch inner hub 43 and 67. Then each needle acts as a column or post which is in compression and no perceivable rotation will occur. On the other hand, when an attempt is made to rotate the outer hubs 43 and 67 in the opposite direction, then the needles are deflected over the top of the knurls or grooves and a continuous rotation occurs. The clutch, therefore, represents a device in which the relative motion between the inner hubs and outer hubs occurs relatively freely in one direction, while motion in the opposite direction is prevented.

As shown in the figures, a left and right clutch are employed to provide for easy turning of the cart during operation. If the cart is gripped by handle 2, and one attempts to turn the cart so that the front wheel 63 moves to the left, right tire 49 remains fixed and the left tire 49 will rotate forward and the cart turns. If one then attempts to turn the cart so that the front wheel 63 moves to the right, the left tire 49 remains fixed and the right tire 49 rotates forward and the cart turns. In normal operation, with the electrical power applied, either tire 82 or 49 can rotate faster than the axle 42. Neither tire 82 or 49 can rotate slower.

Figure 4:
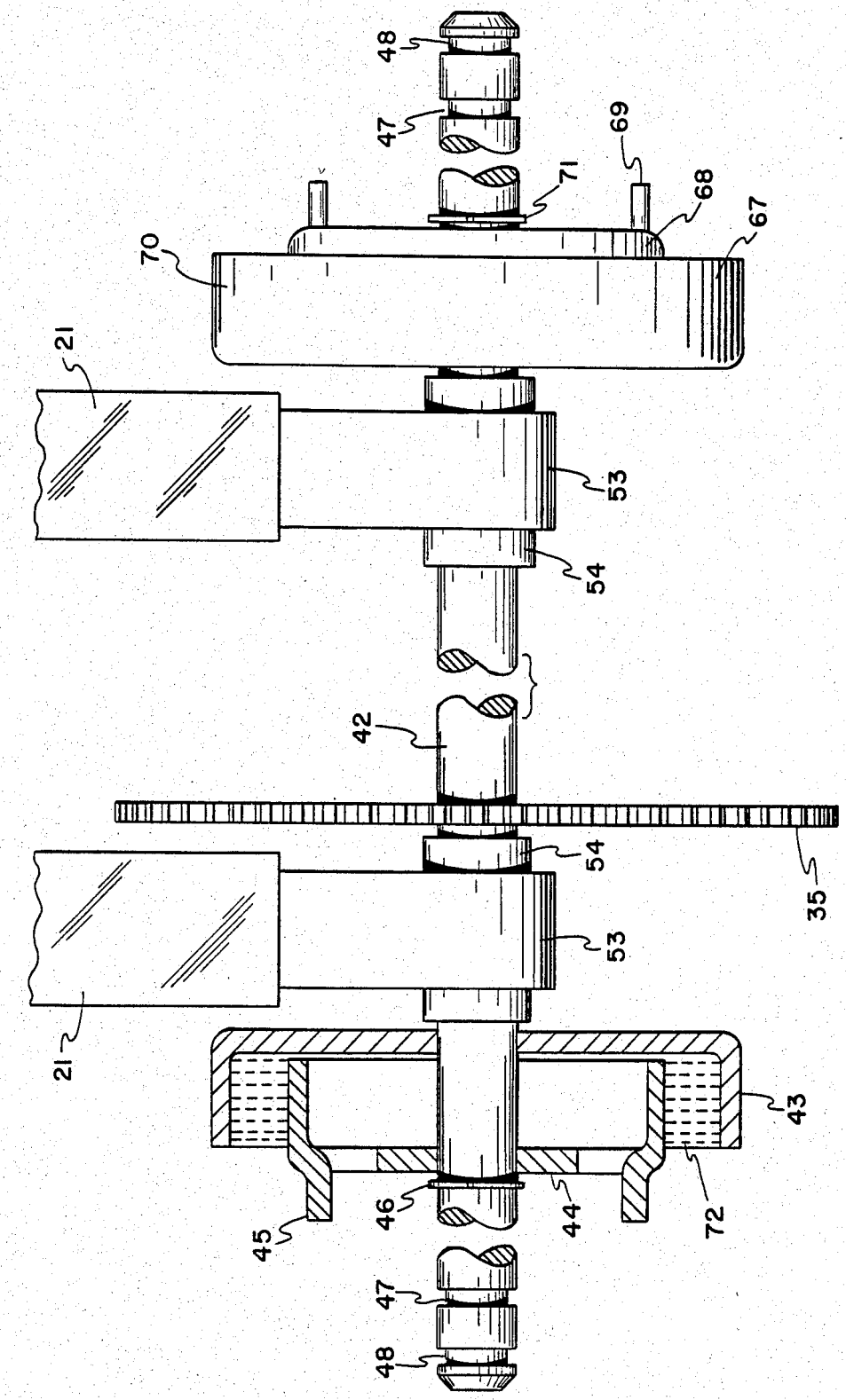
FIG. 4 is a front elevational view of the clutch assembly.
Figure 5A:
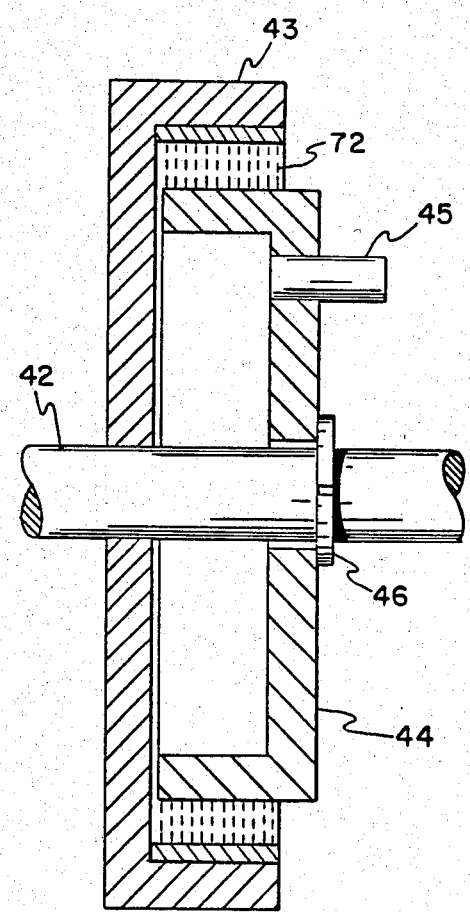
FIGS. 5A and 5B show the construction of the novel clutch in detail.
Figure 5B:
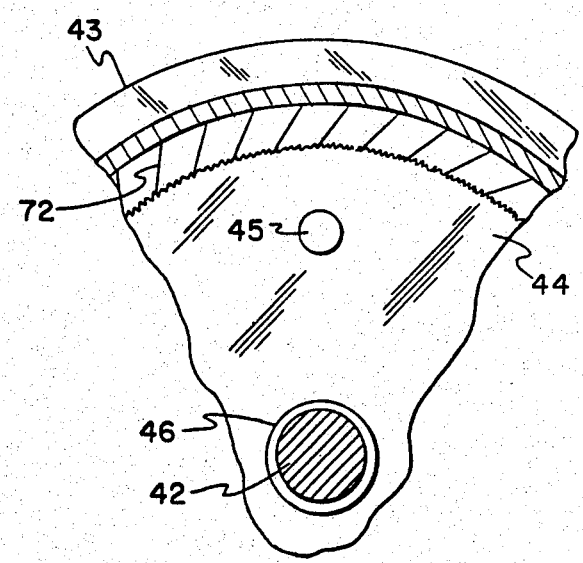

FIGS. 4 and 5 illustrate further the operation of the needle clutch. When the shaft and outer housing are rotating in a counter-clockwise direction, the needles engage the serrations or knurls on the outside surface of the inner hub. When a resisting load is applied in the direction of rotation of the outer hub and against the attachment point, the needles will be placed in compression, thus transmitting substantially all of the force from the outer housing to the inner hub. If the outer housing reverses its direction, and the load on the inner hub remains, then the needles are removed from compression and they deflect up and over the serrations on the inner hub and substantially no force is transmitted to the inner hub.

If the clutch which has been described above is called a left hand unit, then by canting the needles in the opposite direction, a right hand clutch is obtained which transmits maximum force from the outer to the inner hub with clockwise rotation. It is also possible to drive the inner hub and transmit force to the outer hub. In this case, left hand units become right hand and vice versa.

When the maximum force is being transmitted from the outer housing to the inner hub, or from the inner hub to the outer housing, depending upon which is being used as load and driver, the clutch may be considered to be in the locked up condition. When the directions of input rotation are reversed, the clutch may be considered to be in the override condition. The amount of force transmitted to the inner hub or to the outer housing, depending on which is load and which is driven, while in the override condition may be varied by controlling the interference in fit between the outer housing with needles and carrier mounted on the outside surface of the inner hub. Thus, as the diameter of the inner hub increases, while the outer housing remains fixed, then the force transmitted on the override condition increases.

The clutch according to the present invention may be used for many devices, for instance, lawn mowers, tricycles, incremental feeding devices, attached to a variety of devices, conveyor systems, wrenches, rollers operating only in one direction.

What is claimed is:

1. A battery energized, motor driven vehicle for loads such as golf loads and the like, which comprises a tubular frame consisting of an upper stem (14) and a lower stem (80), a front guiding wheel connected to the end of the lower stem, the tubular frame comprising an inverted U-shaped member (21) in the median position thereof and an axle connected (42) to said inverted U-shaped member, two side wheels dismountably connected to said axle, clutches connected to said side wheels, at least one load basket (16, 56), dismountably mounted onto said tubular frame, an electric motor carried by said inverted U-shaped member, a battery connectable to said motor and located on one side of said inverted U-shaped member control means for moving and stopping said vehicle and for adjusting the speed, said control means comprising a handle having a free distal end portion adapted to be grasped to move the vehicle and an end portion proximate to the vehicle and in telescopic engagement with said upper stem, said control means comprising a rheostat mounted on said handle, a pinion and a rack, the rack being attached to the lower portion of said upper stem, said pinion being engageable with said rack, the position of the rheostat changing in the response to the motion of the handle towards the vehicle, the resulting resistance decreasing as the handle is depressed towards the vehicle, whereby the speed of the vehicle increases, said rheostat comprising a dead section, an active section and an insulator portion therebetween the vehicle being idle when the rheostat wiper is located within the dead section, the rheostat wiper contacting the active portion when the vehicle is activated, electric current flowing from said battery and said motor when the cart is activated and wherein each of the clutches comprises an outer hub and an inner hub, a plurality of needles is carried to the inner face of one of said inner and outer hubs, said needles being canted in a direction pointing towards the front wheel, the outer surface of the other hub having a serrated surface, said needles being engageable with said serrated surface whereby rotational force is transmitted in a predetermined direction.

* * * * *